United States Patent
Hagiwara et al.

(10) Patent No.: US 7,668,453 B2
(45) Date of Patent: Feb. 23, 2010

(54) IMAGE TAKING APPARATUS INCLUDING A LIGHT QUANTITY CONTROL DEVICE THAT CONTROLS TRANSMITTED VOLUME OF THE SUBJECT LIGHT

(75) Inventors: Tatsuhiko Hagiwara, Asaka (JP); Naoyuki Nishikawa, Minami-Ashigara (JP); Yoshihiro Ito, Asaka (JP); Tetsuya Okumura, Saitama (JP)

(73) Assignees: FUJIFILM Corporation, Tokyo (JP); FUJINON Corporation, Saitama (JP)

( * ) Notice: Subject to any disclaimer, the term of this patent is extended or adjusted under 35 U.S.C. 154(b) by 456 days.

(21) Appl. No.: 11/590,859

(22) Filed: Nov. 1, 2006

(65) Prior Publication Data
US 2007/0098393 A1  May 3, 2007

(30) Foreign Application Priority Data
Nov. 1, 2005  (JP) .............................. 2005-318619

(51) Int. Cl.
*G03B 7/00* (2006.01)
*G02F 1/00* (2006.01)
(52) U.S. Cl. .................. 396/241; 396/457; 396/506
(58) Field of Classification Search ................. 396/457, 396/506, 241; 359/230
See application file for complete search history.

(56) References Cited

U.S. PATENT DOCUMENTS

| 4,645,304 A | * | 2/1987 | Kawamura et al. .......... 349/111 |
| 6,097,451 A | * | 8/2000 | Palmer et al. ................. 349/14 |
| 6,359,664 B1 | * | 3/2002 | Faris .......................... 349/15 |
| 2002/0118464 A1 | * | 8/2002 | Nishioka et al. ............ 359/642 |

FOREIGN PATENT DOCUMENTS

| JP | 2001-083554 A | | 3/2001 |
| JP | 2003205496 A | * | 7/2003 |

* cited by examiner

*Primary Examiner*—Christopher Mahoney
(74) *Attorney, Agent, or Firm*—Sughrue Mion, PLLC

(57) ABSTRACT

The image taking apparatus of the invention includes a light quantity control device that is arranged on the optical axis of subject light and controls transmitted volume of the subject light. The light quantity control device includes a light quantity control layer and a pair of light-transmissive electrodes. The light quantity control layer expands and contracts in accordance with an electric field generated therein and thereby changes the transmitted volume of the subject light. The electrodes are disposed so as to sandwich the light quantity control layer and generate an electric field in the light quantity control layer, in response to application of voltage, thereby causing the light quantity control layer to expand and contract.

4 Claims, 11 Drawing Sheets

IMAGE TAKING APPARATUS INCLUDING A LIGHT QUANTITY CONTROL DEVICE THAT CONTROLS TRANSMITTED VOLUME OF THE SUBJECT LIGHT

BACKGROUND OF THE INVENTION

1. Field of the Invention

The present invention relates to an image taking apparatus that generates image data according to image taking operation and that includes an imaging device generating image data by reading a subject image formed on an imaging surface and an image taking optical system forming subject light on the imaging surface.

2. Description of the Related Art

Typically, a diaphragm, an ND filter and the like for adjusting the amount of subject light according to ambient lighting conditions are provided in an image taking apparatus that includes an image taking optical system forming subject light on an imaging surface and generates image data according to image taking operation. Such a diaphragm is, for example, arranged by inserting a plate with an opening such that the opening may be positioned around an optical axis to enable light-amount adjustment. Another example of such a diaphragm is obtained by defining an opening by plural aperture blades surrounding an optical axis and by significantly changing the magnitude of the opening to control the amount of light passing the optical axis. Alternatively, the typical ND filter is used by being inserted into the optical axis so as to attenuate the amount of light passing therethrough. With the aid of such light-amount adjusting tools, a user can perform shooting according to ambient light conditions to obtain favorable high-quality still image data.

Some image taking apparatuses have movie shooting function, and thus, aided by the light-amount adjusting tools, a user can also obtain favorable high-quality movie image data.

Here, it should be noted that, in a typical movie shooting, voice data is recorded with movie image data.

However, mechanic sounds generated when driving the aperture blades and the ND filter sometimes happen to be recorded via a microphone disposed in the image taking apparatus.

Such mechanic sounds are unwanted for a user and thus it is desirable to suppress such sounds.

Meanwhile, light-adjustment glass is proposed as a tool to adjust the transmitted amount of light (see, for example, Japanese Patent Application Publication No. 2001-83554).

The light-adjustment glass disclosed in Japanese Patent Application Publication No. 2001-83554 is formed by polymer gel particles including light-absorbing pigments and a solvent sandwiched between the surfaces of the glass. The polymer gel particles reversibly expand and contract by absorbing and releasing the solvent in response to change in temperature, and thus unit area of photo-reactive pigments changes to control the transmitted amount of light. Accordingly, such light-adjustment glass can control the transmitted amount of light by expansion and contraction of polymer gel particles without generating mechanic sounds.

Thus, it is expected that use of such light-adjustment glass in an image taking apparatus as a light-amount control tool may enable control of the transmitted amount of light without generating mechanic sounds.

However, as the light-adjustment glass disclosed in Japanese Patent Application Publication No. 2001-83554 is based on temperature change, a temperature-control device needs to be disposed in an image taking apparatus, which raises a problem in terms of cost and size of the apparatus. Accordingly, it is not desirable to use the light-adjustment glass as a light-amount adjustment tool of an image taking apparatus.

SUMMARY OF THE INVENTION

The present invention has been made in view of the above circumstances, and provides an image taking apparatus that adjusts light amount as well as suppresses sounds.

A first image taking apparatus of the invention includes an imaging device that generates image data by reading a subject image formed on an imaging surface thereof and an image taking optical system that forms subject light on the imaging surface, and generates image data in accordance with image taking operation, the image taking apparatus including:

a light quantity control device that is arranged on an optical path of the subject light and controls transmitted volume of the subject light, the light quantity control device including:

a light quantity control layer that expands and contracts in accordance with an electric field generated in the light quantity control layer and thereby changes the transmitted volume of the subject light; and a pair of light-transmissive electrodes that are disposed so as to sandwich the light quantity control layer, and generate an electric field in the light quantity control layer, in response to application of voltage, thereby causing the light quantity control layer to expand and contract.

According to the first image taking apparatus, use of the light quantity control device that controls transmitted volume of subject light by an electric field realizes the image taking apparatus with the function of an aperture and a shutter without the use of an aperture blade and an ND filter. Additionally, as the light quantity control device does not include an aperture blade, a shutter and other mechanical sound-producing device, it can realize suppression of sounds generated by an aperture, a shutter and the like. Further, reliability of the apparatus is enhanced as the apparatus is free from degradation of a mechanical device. Also, high-speed aperture and shutter function can be realized as the transmitted volume of light is changed according to the electric field formed in the light quantity control layer.

Preferably, the first image taking apparatus of the invention has the light quantity control layer made of liquid crystal elastomer in which light-absorbing pigments are dispersed.

As the light quantity control layer is made of liquid crystal elastomer, the light quantity control layer readily expands and contracts according to an electric field. Additionally, as light-absorbing pigments are dispersed in the liquid crystal elastomer, unit area of the light-absorbing pigments changes according to expansion and contraction of the light quantity control layer. Accordingly, the first image taking apparatus is capable of readily controlling the transmitted volume of subject light.

More preferably, the first image taking apparatus of the invention has the electrodes adhered on the light quantity control layer and expand and contract with the light quality control layer.

As the electrodes expand and contract with the light quality control layer, the electric field is spread through the light quality control layer.

A second image taking apparatus of the invention includes an imaging device that generates image data by reading a subject image formed on an imaging surface thereof and an image taking optical system that forms subject light on the imaging surface, and generates image data in accordance with image taking operation, the image taking apparatus including:

a light quantity control device that is arranged on an optical path of the subject light and controls transmitted volume of the subject light, the light quantity control device including:

an expanding and contracting layer that expands and contracts in accordance with an electric field generated in the expanding and contracting layer;

a pair of light-transmissive electrodes that are disposed so as to sandwich the expanding and contracting layer, are adhered on the expanding and contracting layer to expand and contract following expansion and contraction of the expanding and contracting layer, and generate an electric field in the expanding and contracting layer, in response to application of voltage, thereby causing the expanding and contracting layer to expand and contract; and a light quantity control layer that is adhered on at least one of outer surfaces of the electrodes and causes transmitted amount of the subject light to change by expanding and contracting following expansion and contraction of the expanding and contracting layer.

According to the second image taking apparatus as well, use of the light quantity control device that controls transmitted volume of subject light by an electric field realizes the image taking apparatus with the function of an aperture and a shutter without the use of an aperture blade and an ND filter. Additionally, as the light quantity control device does not include an aperture blade, a shutter and other mechanical sound-producing device, it can realize suppression of sounds generated by an aperture, a shutter and the like. Further, reliability of the apparatus is enhanced as the apparatus is free from degradation of a mechanical device. Also, high-speed aperture and shutter function can be realized as the transmitted volume of light is changed according to the electric field formed in the expanding and contracting layer.

Further, in comparison with the first image taking apparatus, provision of the expanding and contracting layer as well as the light quantity control layer enables dispersion of larger amount of light-absorbing pigments in the light quantity control layer, thereby enhancing the degree of freedom in controlling transmitted light volume.

Preferably, the second image taking apparatus of the invention has the expanding and contracting layer made of liquid crystal elastomer.

As the expanding and contracting layer is made of liquid crystal elastomer and thus readily expands and contracts according to an electric field, the transmitted volume of subject light is readily controlled.

More preferably, the second image taking apparatus of the invention has the light quantity control layer made of elastic polymer in which light-absorbing pigments are dispersed.

As the light quantity control layer expands and contracts, unit area of the light-absorbing pigments is readily changed.

As described above, the image taking apparatus of the present invention is capable of light volume adjustment as well as sound suppression.

BRIEF DESCRIPTION OF THE DRAWINGS

The invention will be described with reference to the accompanying figures of which.

DETAILED DESCRIPTION OF THE INVENTION

Figure 1A:
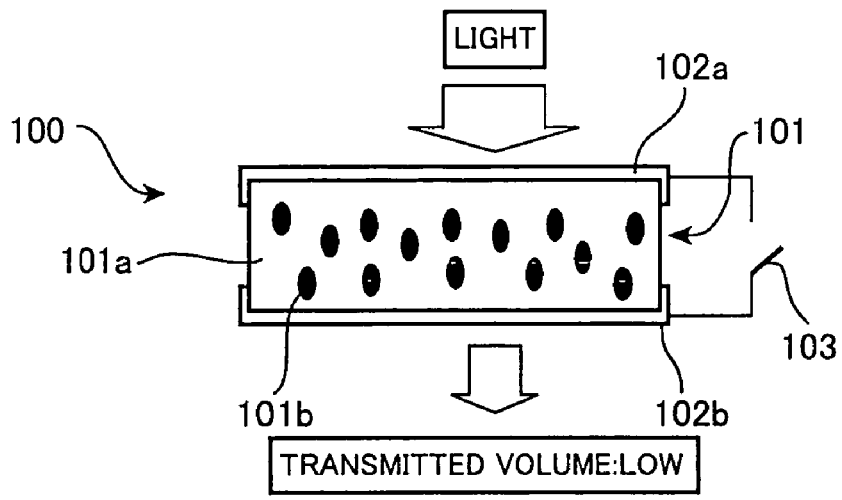
FIG. 1A is a conceptual diagram illustrating the principle of a light quantity control device used in a first image taking apparatus according to one embodiment of the invention.

Embodiments of the present invention will be described below with reference to the drawings.

FIG. 1 is a conceptual diagram illustrating the principle of a light quantity control device used in a first image taking apparatus according to one embodiment of the invention.

A light quantity control device 100 shown in FIG. 1 has a light quantity control layer 101 that expands and contracts in accordance with an electric field generated therein so as to change transmitted volume of subject light. The light quantity control layer 101 is composed of liquid crystal elastomer 101a (hereafter referred to as LC elastomer) and light-absorption pigments 100b dispersed in the LC elastomer 101a.

The LC elastomer 101a is liquid crystal polymer having rubber elasticity and expands and contracts in accordance with an electric field. The pigments 100b are black pigments such as inorganic pigments, black organic pigments, a mixture of plural types of organic pigments, black organic dye, and a mixture of plural types of organic dyes. Examples of such mixture of plural types of organic pigments are organic pigments of colors complementary to each other or of three primary colors, and a mixture of organic dyes may be of colors complementary to each other or of three primary colors. Specifically, NKX-1336 (a product of Nihon Kanko Shikiso Co. Ltd.) and the like can be employed as a mixture of black pigments.

Additionally, the light quantity control device 100 has a pair of electrodes 102a and 102b that are adhered on the light quantity control layer 101 and expand and contract with the light quantity control layer 101.

Figure 1B:
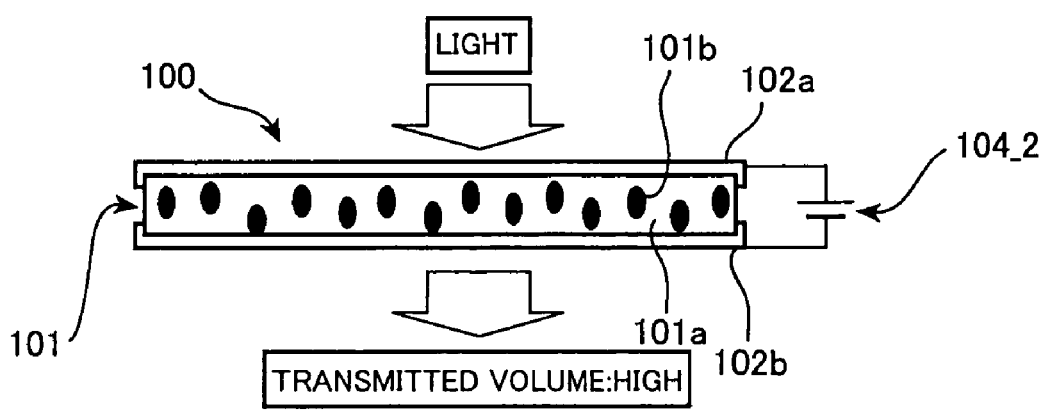
FIG. 1B is a conceptual diagram illustrating the principle of a light quantity control device used in a first image taking apparatus according to one embodiment of the invention.

As shown in FIG. 1A, the light quantity control layer 101 has a predetermined width at an initial state where a power switch 103 for applying an electric field is off. Turning-on of the power switch 103 causes the light quantity control device 100 to be electrically connected to power source 104_2 as shown in FIG. 1B, resulting in generation of an electric field between the electrodes 102a and 102b. The resultant electric field causes the light quantity control layer 101 as well as the electrodes 102*a* and 102*b* to elongate. The elongated light quantity control layer 101 leads to decrease in unit area of pigments that absorb subject light, and thus to increase in transmitted volume of subject light. By subsequent turning-off of the power switch 103, the light quantity control device 100 is set back to the initial state. Such variable control of voltage enables expansion and contraction of the light quantity control device 100, in response to an electric field generated, and change in transmitted volume of subject light.

Now, a digital camera that is an example of the first image taking apparatus will be described.

Figure 2:
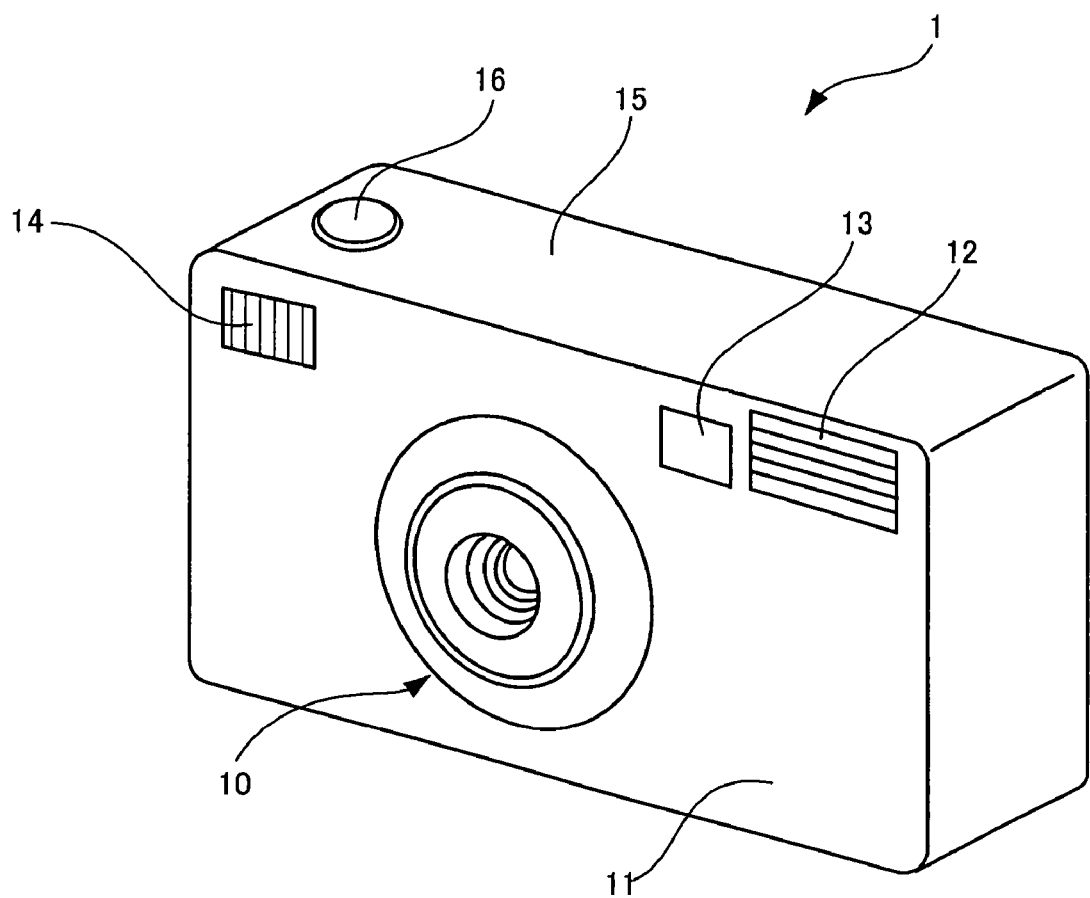
FIG. 2 is an external perspective view of a digital camera as an example of the first image taking apparatus.
Figure 3:
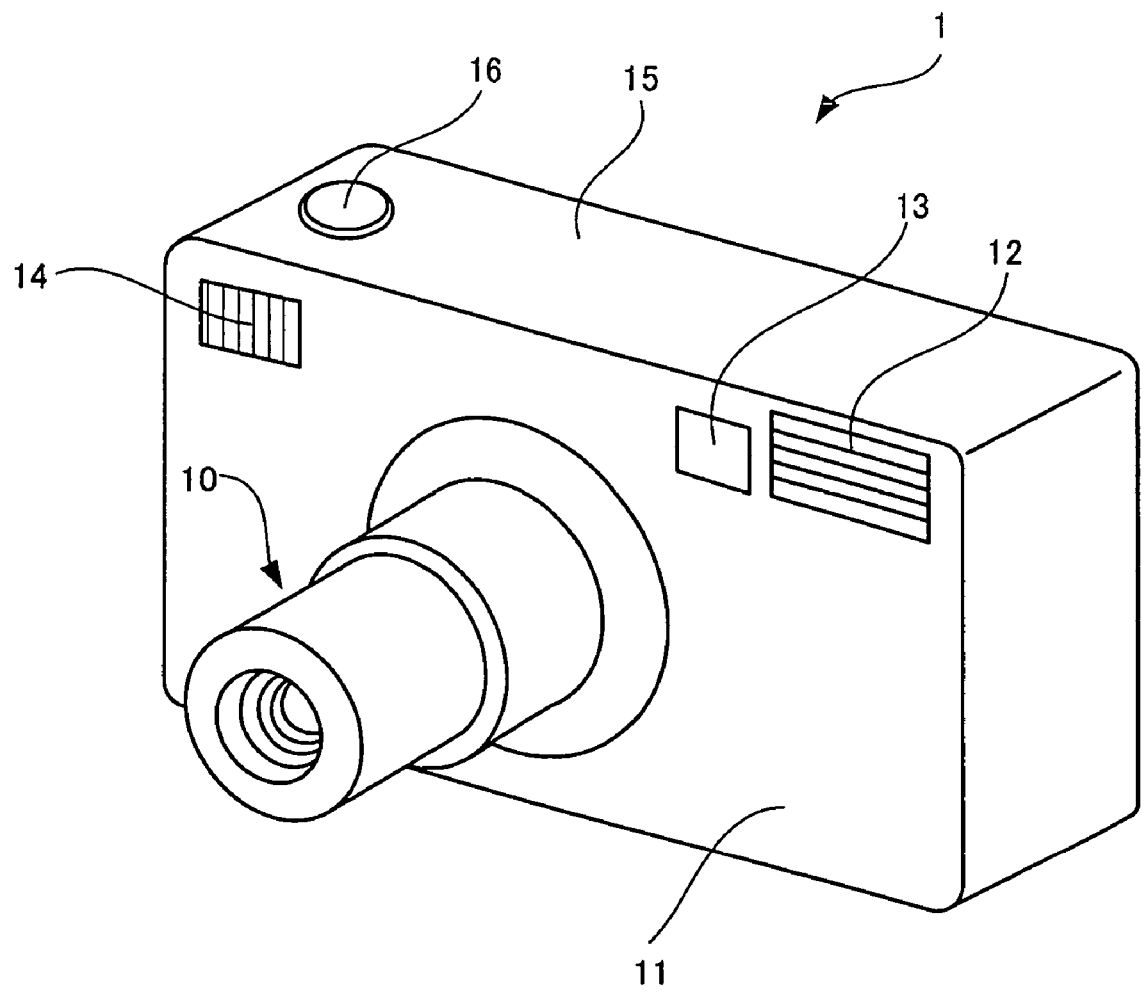
FIG. 3 is another external perspective view of the digital camera.

FIG. 2 and FIG. 3 are both external perspective views of the digital camera 1 as viewed obliquely from the above.

In FIG. 2, a lens barrel 10, in which an image taking lens is incorporated, of the digital camera 1 is collapsed, while in FIG. 3 the lens barrel 10 is extended.

Referring to FIG. 2 and FIG. 3, a front face 11 of the digital camera 1 is provided with a flash emission window 12 through which flash is emitted toward a subject, a finder object window 13 through which a subject is seen, and a voice recording microphone 14. A top face 15 of the digital camera is provided with a release button 16.

Figure 4:
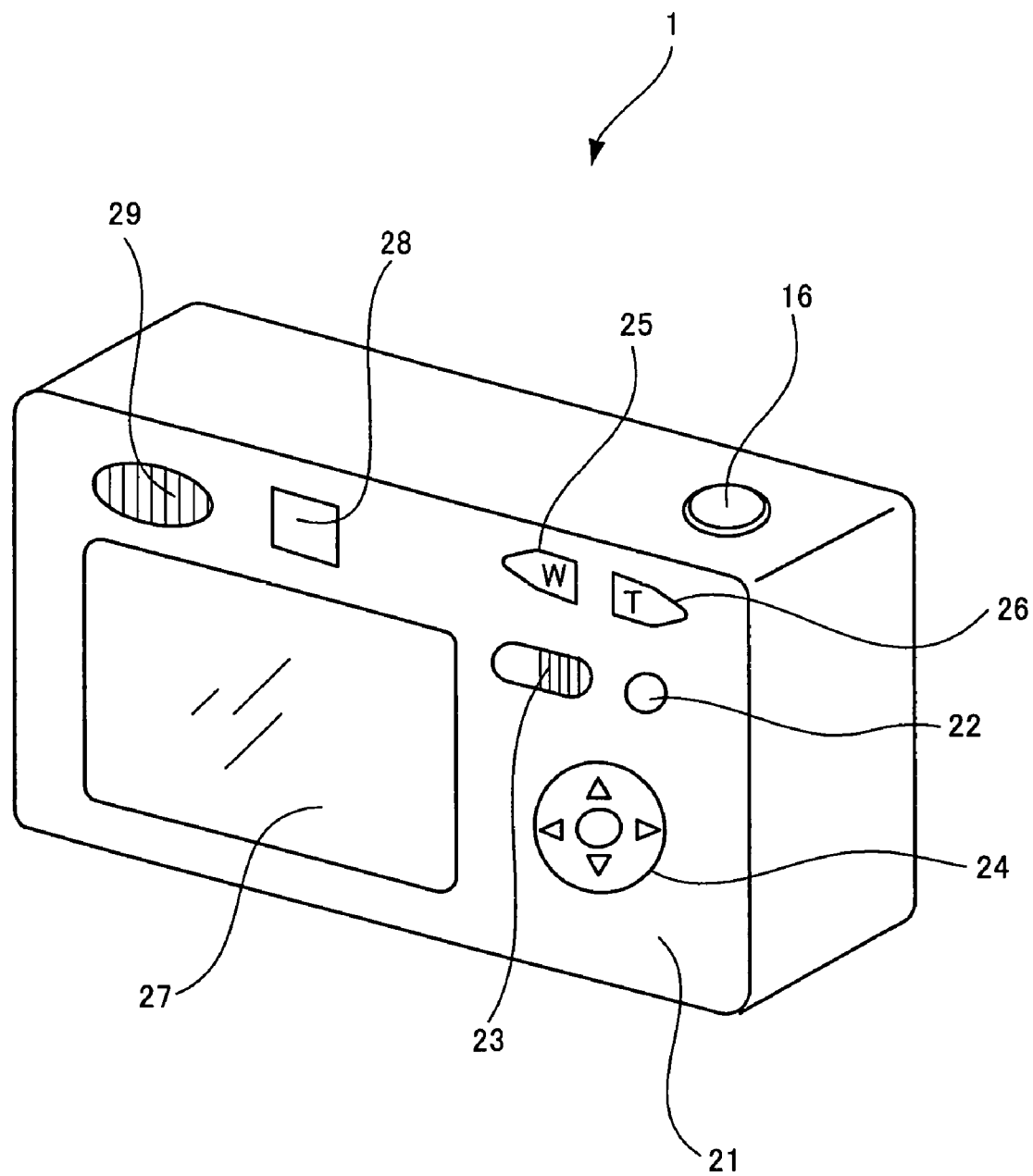
FIG. 4 is an external perspective view of the digital camera as obliquely viewed from the above of its back.

FIG. 4 is an external perspective view of the digital camera 1 as obliquely viewed from the above of its back.

Referring to FIG. 4, a back face 21 of the digital camera 1 is provided with a power button 22 and a mode switch 23. The power button 22 turns on and off the power source of the digital camera 1 and the mode switch 23 switches between the shooting mode and the replay mode.

The back face 21 of the digital camera 1 is also provided with a menu/OK button 24 that switches between still shooting and movie shooting in the shooting mode, and that, in the replay mode, selects and executes setting of menu used in still image replay and movie replay.

Further, the back face 21 of the digital camera 1 is provided with a wide-angle zoom key 25, a telephoto zoom key 26, an LCD panel 27, an optical finder eyepiece window 28 and a speaker 29. The wide-angle zoom key 25 is used to set a focal length to the wide-angle side, while the telephoto key 26 is used to set a focal length to the telephoto side. The LCD panel 27 is used to display a subject image, menus to be selected and executed by the menu button 24 and the like. The optical finder eyepiece window 28 is a window through which a user looks at a subject at the time of shooting. The speaker 29 replays sounds recorded by the microphone 14.

Figure 5:
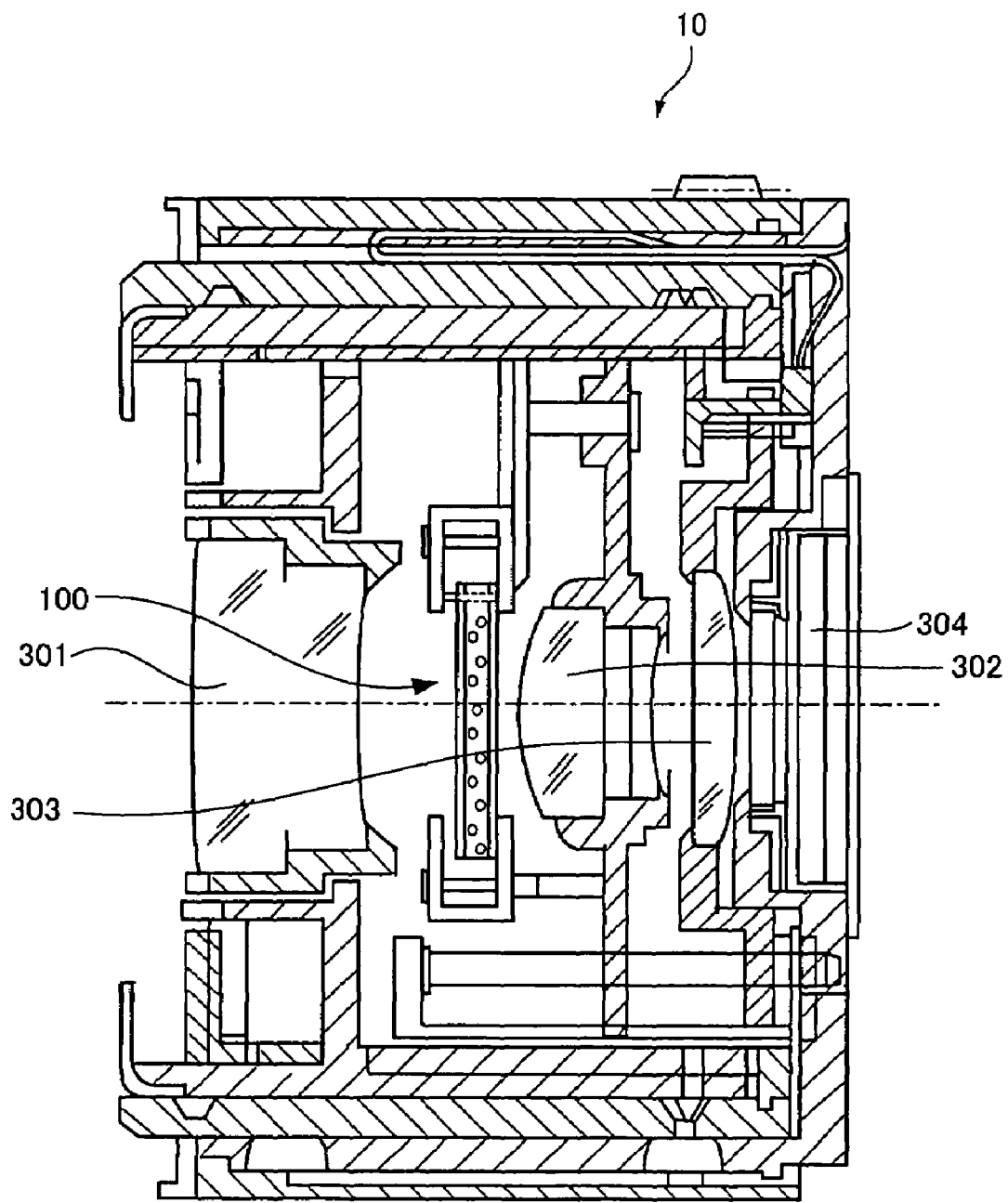
FIG. 5 is a sectional view of a lens barrel collapsed in the digital camera, taken along an optical axis, according to the embodiment.

FIG. 5 is a sectional view of the lens barrel 10 collapsed in the digital camera 1, taken along an optical axis, according to the embodiment of the first image taking apparatus.

Inside a space of the lens barrel 10, a group of shooting lenses including a front group lens 301, a rear group lens 302 and a focus lens 303 are arranged in the described order from the front to the back of the lens barrel 10 such that their optical axes are aligned.

Figure 6:
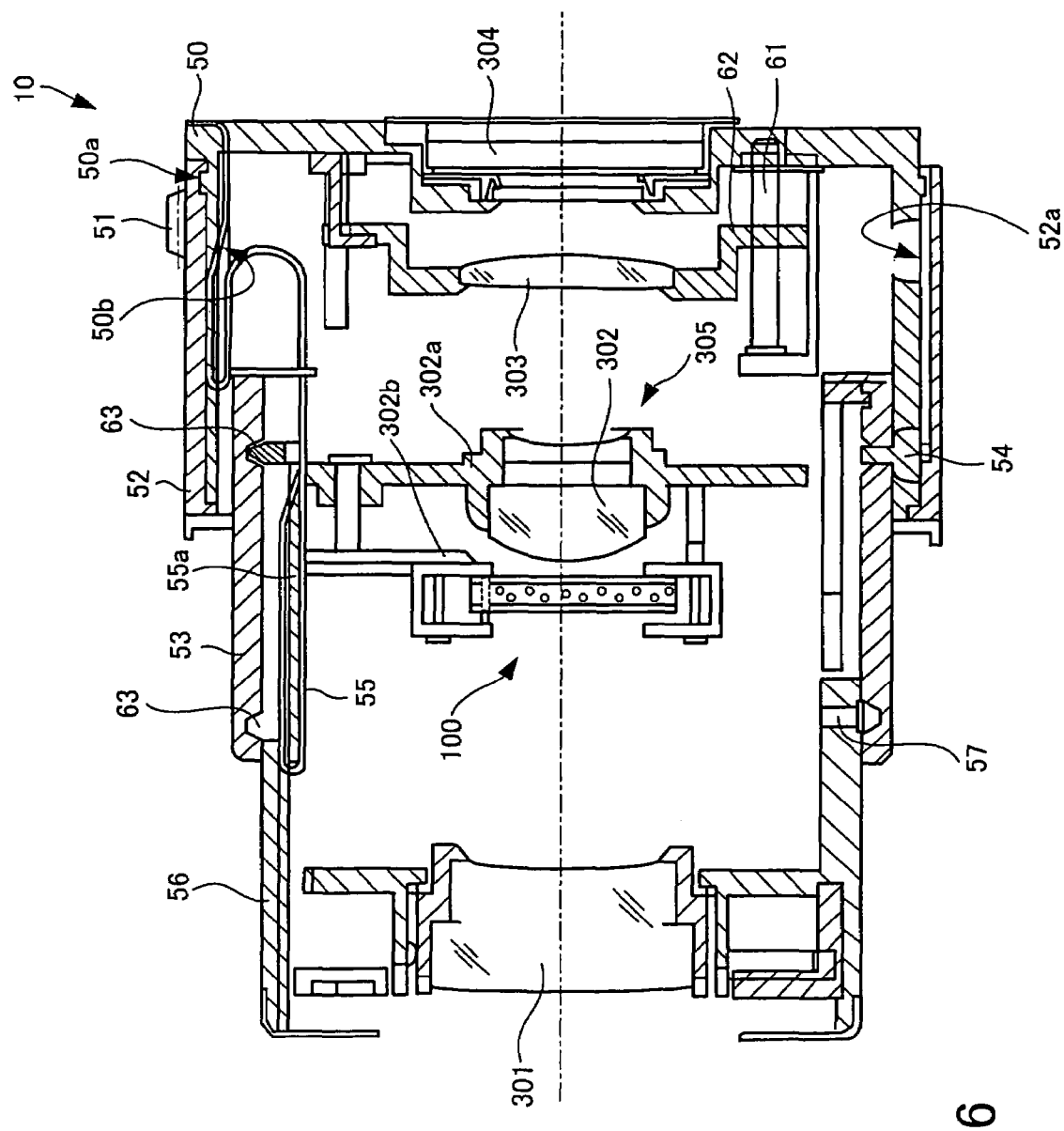
FIG. 6 is a sectional view of the lens barrel, with a rear group lens set to the wide-angle, taken along the optical axis, according to the embodiment.
Figure 7:
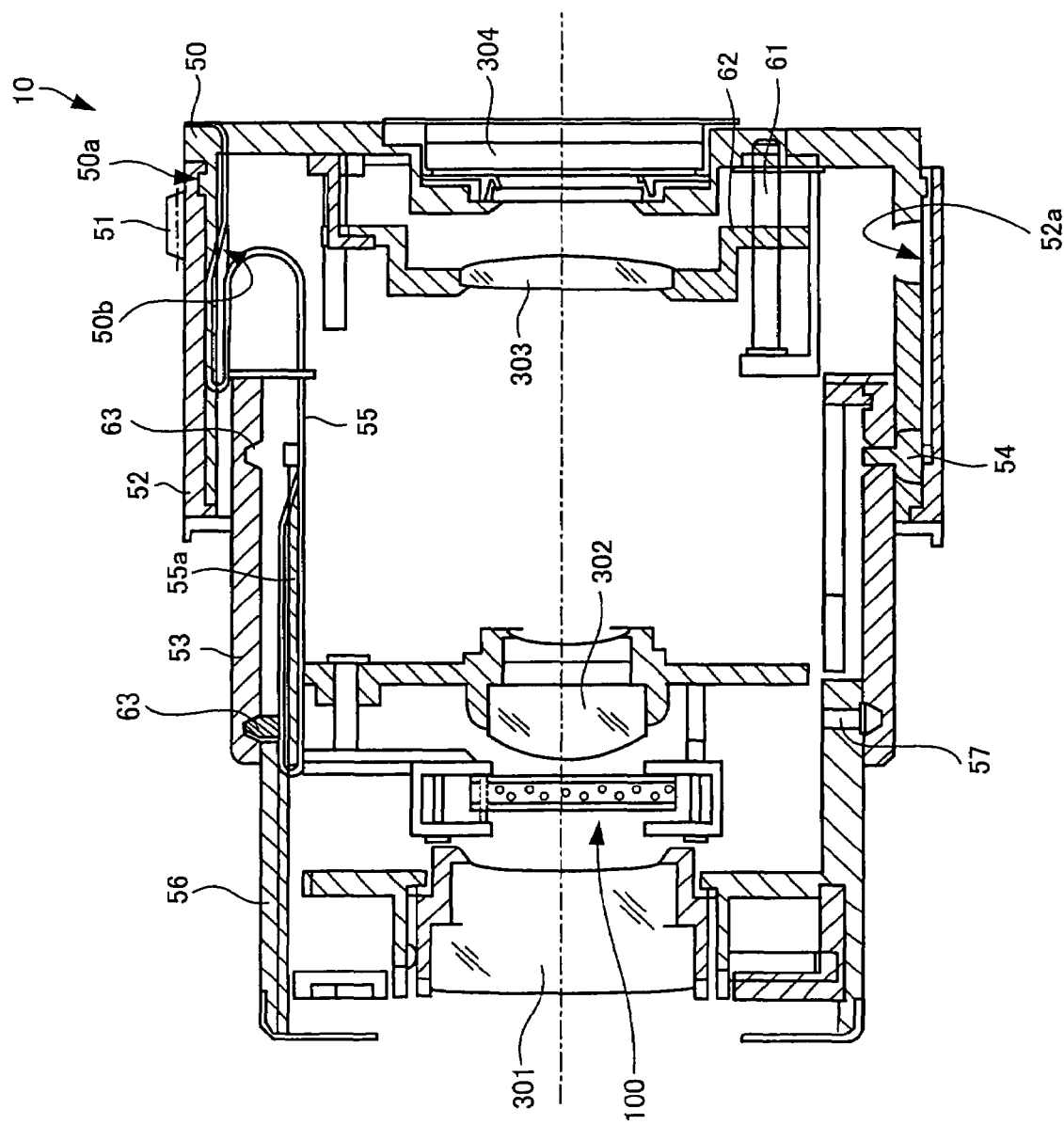
FIG. 7 is a sectional view of the lens barrel, with the rear group lens set to the telephoto side, taken along the optical axis according to the embodiment.

FIG. 6 is a sectional view of the lens barrel 10, with the rear group lens 302 set to the wide-angle, taken along the optical axis, according to the embodiment. FIG. 7 is a sectional view of the lens barrel 10, with the rear group lens 302 set to the telephoto side, taken along the optical axis according to the embodiment.

In the above-described shooting lenses, the rear group lens 302 moves along the optical axis between the wide-angle end shown in FIG. 6 and the telephoto end shown in FIG. 7, so that focal length is changed. The focus lens 303 moves along the optical axis to adjust focus. The light quantity control device 100 for adjusting light quantity of subject light, which will be described later in detail, is provided between the front group lens 301 and the rear group lens 302. In the rear side of the focus lens 303, a CCD 304 is provided that reads subject light to generate image data. The CCD 304 is an example of "the imaging device" of the invention.

Further, the lens barrel 10 is provided with a fixed cylinder 50 fixed to the camera body and a driving cylinder 52 rotatable relative to the fixed cylinder 50. A projection 50*a* is circumferentially formed on the outer circumference surface of the fixed cylinder 50, and a groove is formed on the inner circumference surface of the driving cylinder 52. Engagement of the projection 50*a* with the groove restricts movement of the driving cylinder 52 along the optical axis relative to the fixed cylinder 50. On the outer circumference surface of the driving cylinder 52, a gear 51 is provided that receives rotation driving force transmitted from a motor (not shown) and thereby causes the driving cylinder 52 to rotate.

Further, a keyway 52*a* extending along the optical axis is formed in the driving cylinder 52. A pin-shaped cam follower 54 secured to the rotationally moving cylinder 53 fits into the key way 52*a* through a helical cam groove formed in the fixed cylinder 50. Accordingly, rotation of the driving cylinder 52 causes the rotationally moving cylinder 53 to rotationally move along the cam groove in the direction of the optical axis.

A rectilinear frame 55 is provided inside the rotationally moving cylinder 53. The rectilinear frame 55 is engaged with the rotationally moving cylinder 53 so as to be rotatable relative to the rotationally moving cylinder 53, but the rotation of the rectilinear frame 55 is restricted as the rectilinear frame 55 is engaged in a keyway 50*b* of the fixed cylinder 50. Accordingly, when the rotation of the driving cylinder 52 causes the rotationally moving cylinder 53 to rotationally move along the optical axis, the rectilinear frame 55 moves linearly along the optical axis accompanying the motion of the rotationally moving cylinder 53.

A pin-shaped cam follower 63 is fixed to a rear group lens holding frame 302*a* that holds the rear group lens 302. The cam follower 63 is engaged in both the cam groove of the rotationally moving cylinder 53 and the keyway 55*a*, which extends along the optical axis, of the rectilinear frame 55. Accordingly, rotational travel of the rotationally moving cylinder 53 along the optical axis accompanying rotation of the driving cylinder 52 causes a rear group lens unit 305 to move linearly in the direction of the optical axis along the shape of the cam groove of the rotationally moving cylinder 53.

Further, the lens barrel 10 is provided with a rectilinear cylinder 56 that holds the front group lens 301. The rectilinear cylinder 56 has a cam follower 57 secured thereto that is engaged in both the cam groove of the rotationally moving cylinder 53 and the keyway 55*a*, which extends along the optical axis, of the rectilinear frame 55. Therefore, rotational travel of the rotationally moving cylinder 53 along the optical axis accompanying rotation of the driving cylinder 52 causes the rectilinear cylinder 56 to move linearly in the direction of the optical axis along the shape of the cam groove of the rotationally moving cylinder 53.

The lens barrel 10 is extended in such a mechanism as described above. Alternatively, the reverse rotation of the driving cylinder 52 causes the lens barrel 10 to be collapsed.

In addition, the rotationally moving cylinder 53 is capable of further rotating after extension of the lens barrel 10 is completed while the position of the front group lens 301 being maintained. After the lens barrel 10 is extended, the rear group lens unit 305 moves along the cam groove of the rotationally moving cylinder 53 in the direction of the optical axis so as to adjust a field angle, that is, a focal length.

Meanwhile the focus lens 303 of the shooting lenses is held by a focus lens holding frame 62 that is engaged in threads of a leadscrew 61. Thus, rotation of the leadscrew 61 by a motor (not shown) causes the focus lens 303 to move along the optical axis and then a focal length to be adjusted.

Next, explanation will be made on the light quantity control device 100 and fittings thereof.

Figure 8:
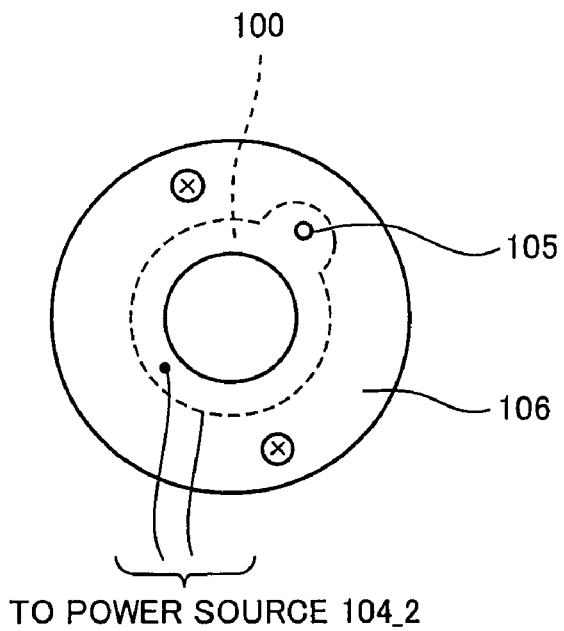
FIG. 8 is a front view of the light quantity control device and fittings thereof.

FIG. 8 is a front view of the light quantity control device 100 and fittings thereof.

Figure 9:
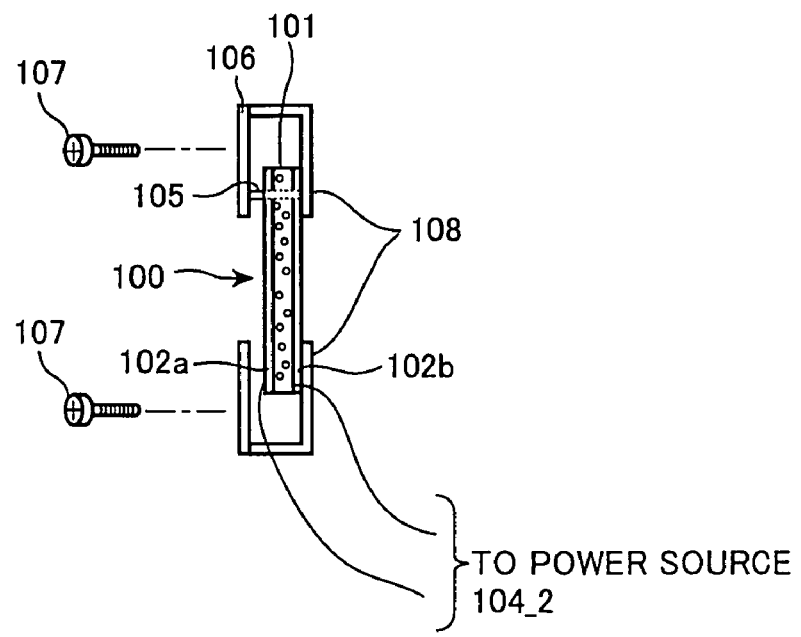
FIG. 9 is a side view of the light quantity control device and fittings thereof.

FIG. 9 is a side view of the light quantity control device 100 and fittings thereof.

The light quantity control device 100 includes the circular light quantity control layer 101 with a projection formed on a part thereof, and electrodes 102a and 102b. The light quantity control device 100 is sandwiched between the electrodes 102a and 102b. Fittings of the light quantity control device 100 are a pinning member 105, an aperture plate 106, screws 107 and a holding frame 108.

The light quantity control device 100 is placed on the holding frame 108 that has an opening formed substantially in the center thereof. The projection of the light quantity control device 100 is pinned on the holding frame 108 only by means of the pinning member 105 so that the light quantity control device 100 is capable of expanding and contracting. The circular aperture plate 106 with an opening formed substantially in the center thereof is attached to the holding frame 108 by means of the screws 107.

Now, explanation continues referring back to FIG. 6.

The light quantity control device 100 is held by a light quantity control device holding frame 302b such that the light quantity control device 100 and the light quantity control device holding frame 302b are able to move along the optical axis with the rear group lens unit 305 constituted by the rear group lens 302 and the rear group lens holding frame 302a.

Next, internal configuration of the digital camera 1 according to the embodiment of the first image taking apparatus will be described.

Figure 10:
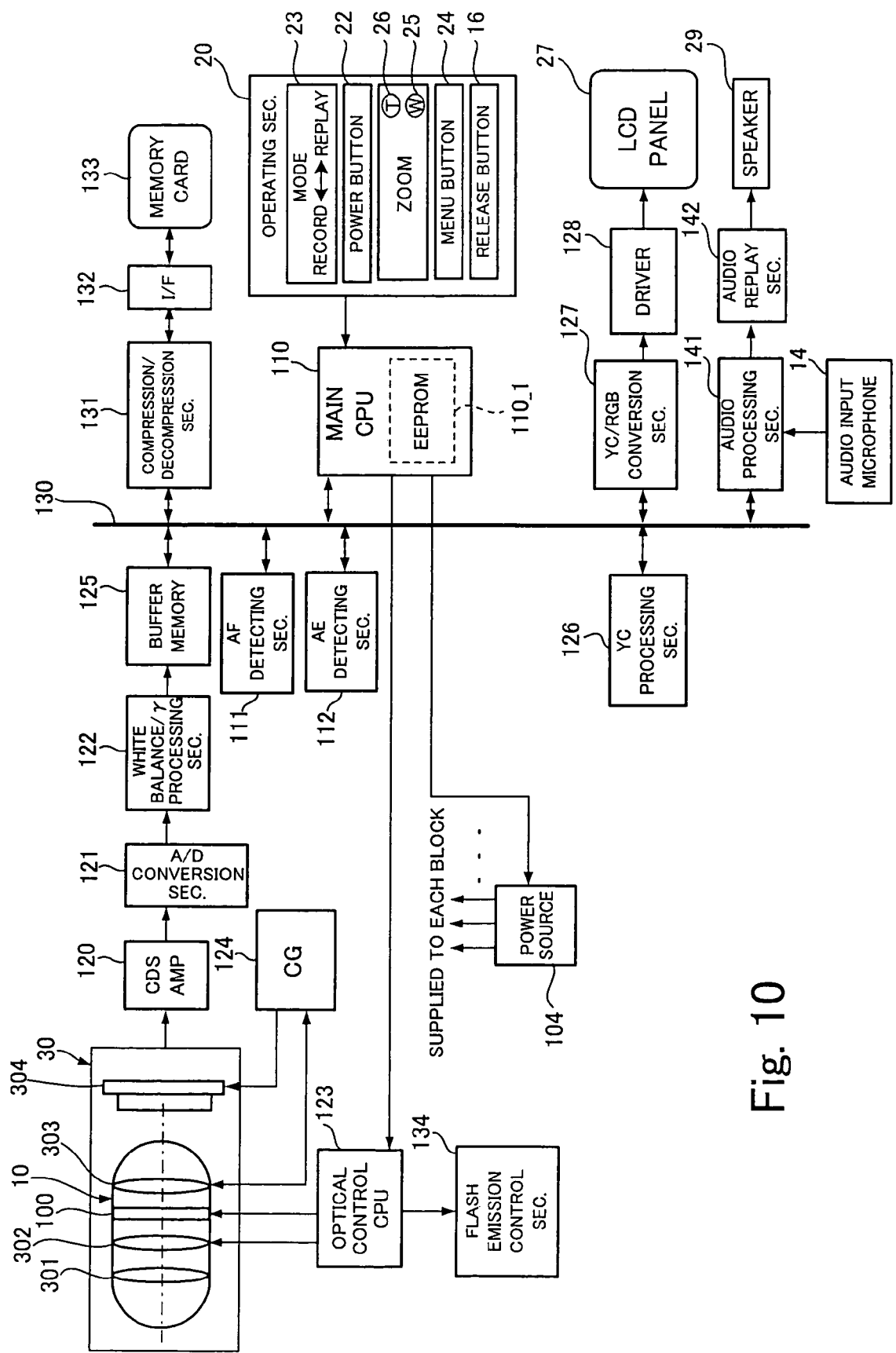
FIG. 10 is a block diagram illustrating a schematic internal configuration of the digital camera shown in FIG. 2.

FIG. 10 is a block diagram illustrating schematic internal configuration of the digital camera 1 shown in FIG. 2.

The digital camera 1 includes a main CPU 110 that controls the whole processing of the digital camera 1.

The main CPU 110 includes an EEPROM 110_1 composed of rewritable nonvolatile memory, and a ROM that stores a program, according to which, operations of the digital camera 1 is controlled by the main CPU 110.

The digital camera 1 includes an operating section 20 and a power source 104. The operating section 20 issues respective instructions in response to operations of the operating members provided on the back face and top face of the digital camera 1 shown in FIGS. 2 and 4. The power source 14 supplies power to each block in response to turning-on of power.

The digital camera 1 includes an imaging section 30 constituting an image taking optical system. As described above, the imaging section 30 includes the CCD 304 and the lens barrel 10 incorporating the light quantity control device 100, operation of which will be described later in detail.

The digital camera 1 includes a CDSAMP 120, A/D conversion section 121, white balance/γ processing section 122, optical control CPU 123 and Clock Generator (CG) 124. The CDSAMP 120 performs, for example, noise reduction of an analog image signal output from the CCD 304, which is then converted into a digital image signal by the A/D conversion section 121. The white balance/γ processing section 122 performs white color adjustment and γ correction in a subject image. The optical control CPU 123, in response to an instruction from the main CPU 110, causes the lens barrel 10 to be extended and moves shooting lenses in the lens barrel 10 by controlling a motor (unshown). The CG 124, in response to an instruction from the main CPU 110, outputs a timing signal via the optical control CPU 123. In sync with a timing signal output from the CG 124, processing in the CCD 304, the A/D conversion section 121, and white balance/γ processing section 122 are sequentially performed.

Further, the digital camera 1 includes an AF detection section 111 that detects information on focusing of an image, while AE detection section 112 detects information on luminance of an image.

Additionally, the digital camera 1 has a buffer memory 125, YC processing section 126, YC/RGB converter 127, driver 128 and bus 130. The buffer memory 125 temporarily stores RGB image data processed in the white balance/γ processing section 122. The Y/C processing section 126 converts a digital image signal input via the bus 130 into a YC signal represented by Y(luminescence) and C (color)and then the YC signal is converted to a RGB signal by the YC/RGB converter 127. Meanwhile low-resolution through image (live image) stored in the buffer memory 125 is supplied to the YC/RGB converter 127 on a first-come-first-served basis. Through image data, which is in RGB signal format, does not require processing in the YC/RGB converter 127, and thus is transmitted to the LCD panel 27 via the driver 128 that performs high-speed processing of through image data, and the resultant through image is displayed on the LCD panel 27.

Additionally, the digital camera 1 has a compression/decompression section 131, I/F 132, memory card 133 and flash emission control section 134. The compression/decompression section 131, in response to an instruction from the main CPU 110, compresses image data of converted YC signals and the I/F 132 provides communication interface conformable to various communication standards so that compressed image data can be stored in the memory card 133. The flash emission control section 134 emits flash through the flash emission window 12.

Further, the digital camera 1 is provided with an audio processing section 141, audio replay section 142. The audio processing section 141 converts sounds collected by a microphone into sound data, while the audio replay section 142 replays sound data by means of the speaker 29.

Next, shooting operation of the digital camera 1 will be described.

In the description below, it is assumed that a user takes a motion picture.

In response to pressing-on of the power button 22 by a user, the operating section 20 accepts the power-on operation and the main CPU 110 initiates a program stored in the ROM and displays an image on the LCD panel 27 and enters the state ready for setting shooting conditions.

At this point, if the user sets the mode switch 23 to shooting mode and selects the movie shooting mode by using the menu button 24, the main CPU causes the CCD 304 at predetermined intervals to output image data representing a subject image formed on the CCD 304 to the CDSAMP 120. The output image data is subjected to signal processing in the subsequent stages beginning with the A/D conversion section 121 and the resultant through image is to be displayed on the LCD panel 27. This is the mechanism that makes the subject image, which is obtained by and within the field angle of the shooting lens and is displayed on the LCD panel 27, look like a motion image.

When a user instructs a field angle using either of the wide-angle zoom key 25 and the telephoto zoom key 26, such instruction is transmitted to the optical control CPU 123 via the main CPU 110. The optical control CPU 123 causes the lens barrel 10, as shown in FIGS. 6 and 7, to extend by controlling the motor (not shown) and moves the rear group lens 302 according to the field angle as well as the focus lens 303 along the optical axis as shown in FIGS. 5, 6 and 7.

Meanwhile, as shooting operation is performed according to the through image being displayed on the LCD panel 27, a focal position is always detected by the AF detection section 111 and the focus lens 303 is moved to the focal position by focusing mechanism, such that a subject image obtained by the digital camera 1 can instantly be displayed as a through image.

At this point, if the user sets to "recording start" by using the menu button 24, field brightness is detected by the AE detection section 112.

Based on the detected field brightness, the optical control CPU 123, in response to an instruction from the main CPU, applies an electric field to the electrodes of the light quantity control device 100. Application of an electric field causes the light quantity control layer 101 composed of the LC elastomer 101a and the pigments 101b as well as the electrodes adhered on the light quantity control layer 101 to elongate. Controlling of application of an electric field enables expansion and contraction of the 101a, resulting in the optimum transmitted volume of subject light in accordance with field brightness and diaphragm adjustment.

Meanwhile, image data representing a subject image formed on the CCD 304 is continuously output to the CDSAMP 120, in which the output image data is subjected to noise reduction processing and supplied to the A/D conversion section 121. The A/D conversion section 121 generates image data of analog-to-digital converted RGB signals, which then is subjected to white balance adjustment and gamma correction in the white balance/γ processing section 122 to be stored in the buffer memory 125. The image data stored in the buffer memory 125 is supplied to the YC processing section 126 to be converted into YC signals, which then is compressed in the compression/decompression section 131. Meanwhile, the main CPU 110 associates voice data at the time of shooting with movie image data so as to be recorded in the memory card 133 via the I/F 132.

The movie image data recorded in the memory card 133 is decompressed in the compression/decompression section 131 and then be converted into RGB signals in the YC/RGB converter 127. The RGB-converted signals are transmitted to the LCD panel 27 via the driver 128 to be displayed on the LCD panel 27 as a movie image representing movie image data.

When an user sets shooting condition to "record end" by using the menu button 24, recording of movie image and voice ends.

In the above description, the light quantity control device 100 is referred to as a diaphragm to control an aperture diameter. However, the light quantity control device 100 may also serve as a shutter to mechanically control shutter speed as well as an aperture diameter by increasing the amount of black pigments dispersed in the light control layer.

Figure 11:
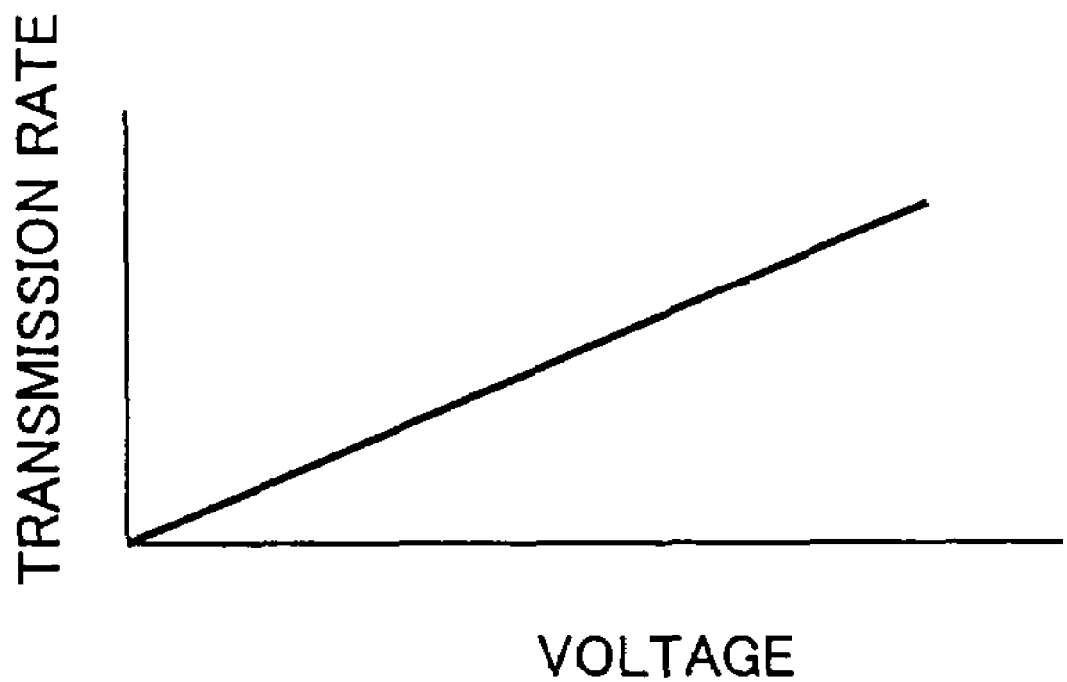
FIG. 11 shows the relation between the applied voltage and the transmission rate of light.

FIG. 11 shows the relation between the applied voltage and the transmission rate (transmittance) of light.

As shown in FIG. 11, the transmitted volume of the light quantity control layer 101 is zero when the applied voltage is zero, and thus the applied voltage and the transmitted volume of light are in proportion by a first-order equation.

Accordingly, by using the light quantity control layer 101 with the feature shown in FIG. 11 in the light quantity control device 100, it is possible to decrease the transmitted volume of light to zero, and to mechanically control shutter speed as well as an aperture diameter. Accordingly, noise suppression and speeding up can be realized by eliminating the need of a mechanical member such as an aperture blade.

Next, explanation will be made on a digital camera of a second image taking apparatus according to an embodiment of the invention.

In describing the second image taking apparatus, the difference between the second image taking apparatus and the first image taking apparatus will only be described.

Figure 12A:
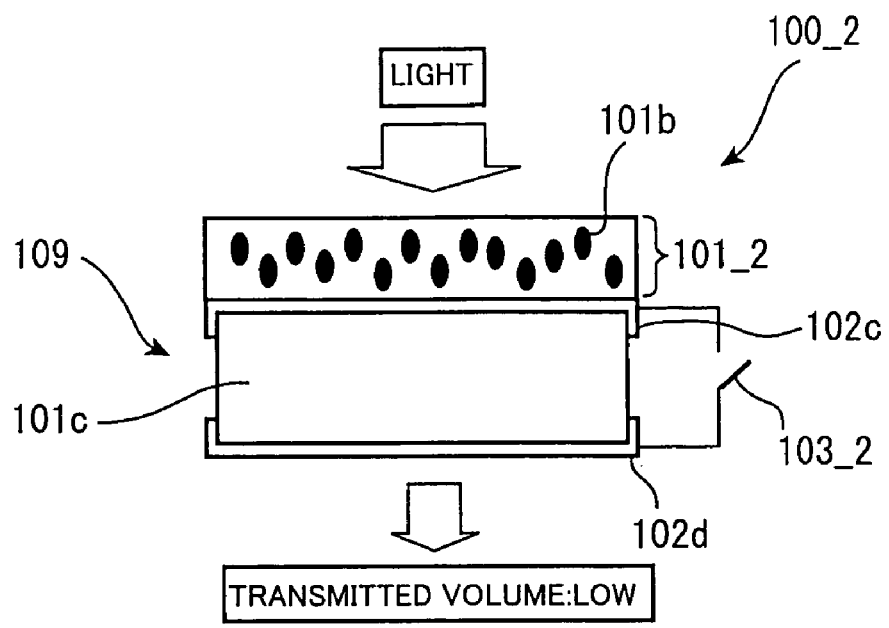
FIGS. 12A and 12B are conceptual diagrams illustrating the principle of a light quantity control device used in a second image taking apparatus according to one embodiment of the invention.
Figure 12B:
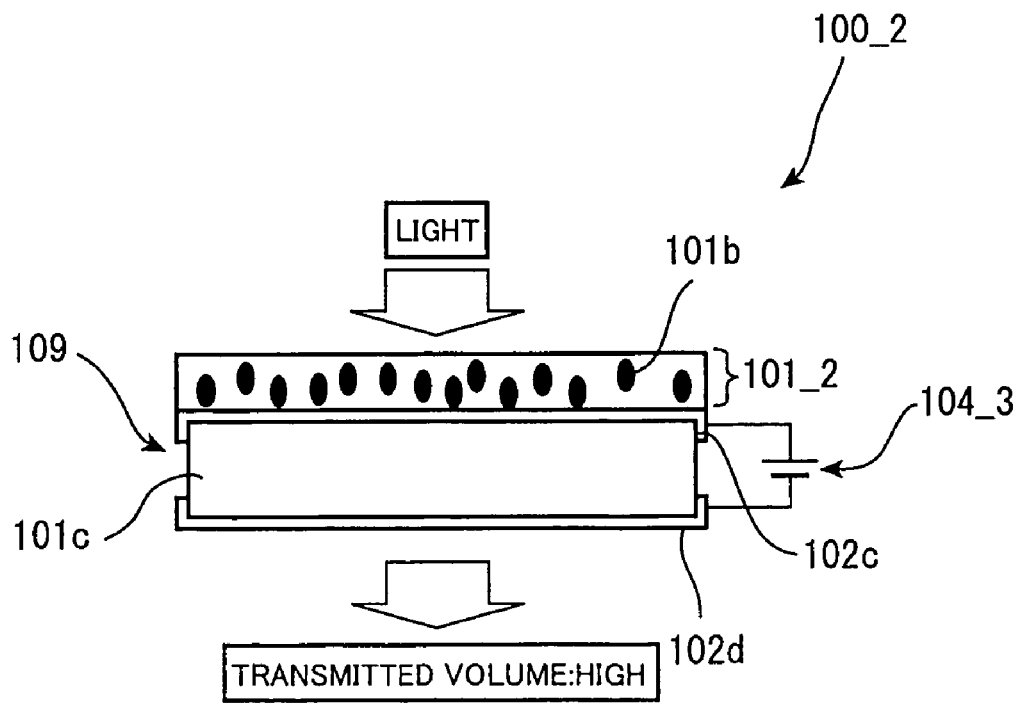

FIGS. 12A and 12B are conceptual diagrams illustrating the principle of a light quantity control device used in the second image taking apparatus according to the embodiment of the invention.

A light quantity control device 100_2 shown in FIGS. 12A and 12B has an expanding and contracting layer 109 composed of liquid crystal elastomer 101c that expands and contracts in accordance with an electric field generated therein.

Additionally, the expanding and contracting layer is sandwiched between a pair of light-transmissive electrodes 102c and 102d that are adhered on the expanding and contracting layer 109 and are made of an elastic polymer member capable of expanding and contracting in accordance with expansion and contraction of the expanding and contracting layer 109.

Further, a light quantity control layer 101_2 is provided that is adhered on the outer surface of the electrode 102c and expands and contracts in accordance with expansion and contraction of the expanding and contracting layer 109 and thereby controls transmitted volume of subject light. The black pigments 101b used in the embodiment of the first image taking apparatus are dispersed in the light quantity control layer 101_2.

As shown in FIG. 12A, the expanding and contracting layer 109 has a predetermined width at a initial state where a power switch 103_2 for applying an electric field is off. Turning-on of the power switch 103_2 causes the expanding and contracting layer 109 to be electrically connected to a power source 104_3 as shown in FIG. 12B, resulting in generation of an electric field between the electrodes 102c and 102d. The resultant electric field causes the expanding and contracting layer 109 as well as the electrodes 102c and 102d to elongate.

The elongated electrode 102c also causes the light quantity control layer 101_2 to elongate, leading to decrease in unit area of pigments that absorb subject light, and thus to increase in transmitted volume of subject light. By subsequent turning-off of the power switch 103_2, the light quantity control device 100_2 is set back to the initial state. Such variable control of voltage enables expansion and contraction of the light quantity control device 100_2, in response to an electric field generated, and change in transmitted volume of subject light.

Thus, by using the light quantity control device 100_2 employed in the embodiment of the second image taking apparatus, instead of the light quantity control device 100 shown in FIGS. 6 through 8, a user can perform movie shooting while suppressing sounds at the time of shooting.

As described above, the present invention can realize the image taking apparatus capable of light quantity adjustment as well as sound suppression. In the above description, LC elastomer is employed in the light quantity control layer of the embodiment of the first image taking apparatus and in the expanding and contracting layer of the embodiment of the second image taking apparatus. However, electrostrictive polymer may be employed that expands and contracts by applying high voltage between electrodes instead of LC elastomer.

What is claimed is:

1. An image taking apparatus including an imaging device that generates image data by reading a subject image formed on an imaging surface thereof and an image taking optical system that forms subject light on the imaging surface, and generating image data in accordance with image taking operation, the image taking apparatus comprising:

a light quantity control device that is arranged on an optical path of the subject light and controls transmitted volume of the subject light, the light quantity control device comprising:

a light quantity control layer that expands and contracts in accordance with an electric field generated in the light quantity control layer and thereby changes the transmitted volume of the subject light; and a pair of light-transmissive electrodes that are disposed so as to sandwich the light quantity control layer, and generate an electric field in the light quantity control layer, in response to application of voltage, thereby causing the light quantity control layer to expand and contract wherein the light quantity control layer is made of liquid crystal elastomer in which light-absorbing pigments are dispersed, and changes the transmitted volume of the subject light by changing the number of the pigments per unit area in a plane across the optical path of the subject light in accordance with expansion and contraction of the light quantity control layer.

2. The image taking apparatus according to claim 1, wherein the electrodes are adhered on the light quantity control layer and expand and contract with the light quantity control layer.

3. An image taking apparatus including an imaging device that generates image data by reading a subject image formed on an imaging surface thereof and an image taking optical system that forms subject light on the imaging surface, and generating image data in accordance with image taking operation, the image taking apparatus comprising:

a light quantity control device that is arranged on an optical path of the subject light and controls transmitted volume of the subject light, the light quantity control device comprising:

an expanding and contracting layer that expands and contracts in accordance with an electric field generated in the expanding and contracting layer;

a pair of light-transmissive electrodes that are disposed so as to sandwich the expanding and contracting layer, are adhered on the expanding and contracting layer to expand and contract following expansion and contraction of the expanding and contracting layer, and generate an electric field in the expanding and contracting layer, in response to application of voltage, thereby causing the expanding and contracting layer to expand and contract; and a light quantity control layer that is adhered on at least one of outer surfaces of the electrodes and causes transmitted amount of the subject light to change by expanding and contracting following expansion and contraction of the expanding and contracting layer wherein the light quantity control layer is made of elastic polymer in which light-absorbing pigments are dispersed, and changes the transmitted volume of the subject light by changing the number of the pigments per unit area in a plane across the optical path of the subject light in accordance with expansion and contraction of the light quantity control layer.

4. The image taking apparatus according to claim 3, wherein the expanding and contracting layer is made of liquid crystal elastomer.

\* \* \* \* \*